United States Patent
Yasuda et al.

(10) Patent No.: US 7,562,679 B2
(45) Date of Patent: Jul. 21, 2009

(54) RESIN PIPE AND RESIN MOLDED COMPONENT

(75) Inventors: Zenichi Yasuda, Aichi-ken (JP); Masanori Nojiri, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 463 days.

(21) Appl. No.: 11/481,018

(22) Filed: Jul. 6, 2006

(65) Prior Publication Data

US 2007/0012374 A1    Jan. 18, 2007

(30) Foreign Application Priority Data

Jul. 13, 2005  (JP)  ............................ 2005-204502
May 18, 2006  (JP)  ............................ 2006-138683

(51) Int. Cl.
*F16L 11/00*   (2006.01)
(52) U.S. Cl. .................. 138/121; 138/137; 138/140; 138/141; 138/173
(58) Field of Classification Search ............... 138/121, 138/122, 173, 137, 140
See application file for complete search history.

(56) References Cited

U.S. PATENT DOCUMENTS

| 5,284,184 | A | * | 2/1994 | Noone et al. | ............... | 138/121 |
| 5,469,892 | A | * | 11/1995 | Noone et al. | ............... | 138/121 |
| 5,792,532 | A | * | 8/1998 | Pfleger | ................. | 428/36.9 |
| 5,829,483 | A | * | 11/1998 | Tukahara et al. | ........... | 138/109 |
| 6,631,741 | B2 | * | 10/2003 | Katayama et al. | ........... | 138/121 |

FOREIGN PATENT DOCUMENTS

JP    A-07-217776    8/1995

* cited by examiner

*Primary Examiner*—Patrick F Brinson
(74) *Attorney, Agent, or Firm*—Posz Law Group, PLC (57) ABSTRACT

A filler pipe, wherein a flow path for a fluid is formed through multiple resin materials being extruded simultaneously and wherein a corrugated part is shaped through peaks and valleys disposed continuously, comprises an outer layer formed from a high density polyethylene, a barrier layer formed from EVOH with superior resistance to fuel permeation, and an inner layer, formed from high density polyethylene. The structure is such that d<L when the depth from the apex of the peak to the bottom of the valley is defined as d, and the distance from the apex of the peak to the barrier layer is defined as L.

19 Claims, 8 Drawing Sheets

RESIN PIPE AND RESIN MOLDED COMPONENT

This application claims the benefit of and priority from Japanese Applications No. 2005-204502 filed Jul. 13, 2005 and No. 2006-138683 filed May 15, 2006, the contents of which are incorporated herein by reference.

BACKGROUND OF THE INVENTION

1. Field of the Invention

The present invention relates to a resin pipe wherein a multilayer pipe, including a barrier layer, is extruded simultaneously and wherein a corrugated part is formed, and to a resin molded component.

2. Description of the Related Art

Figure 9:
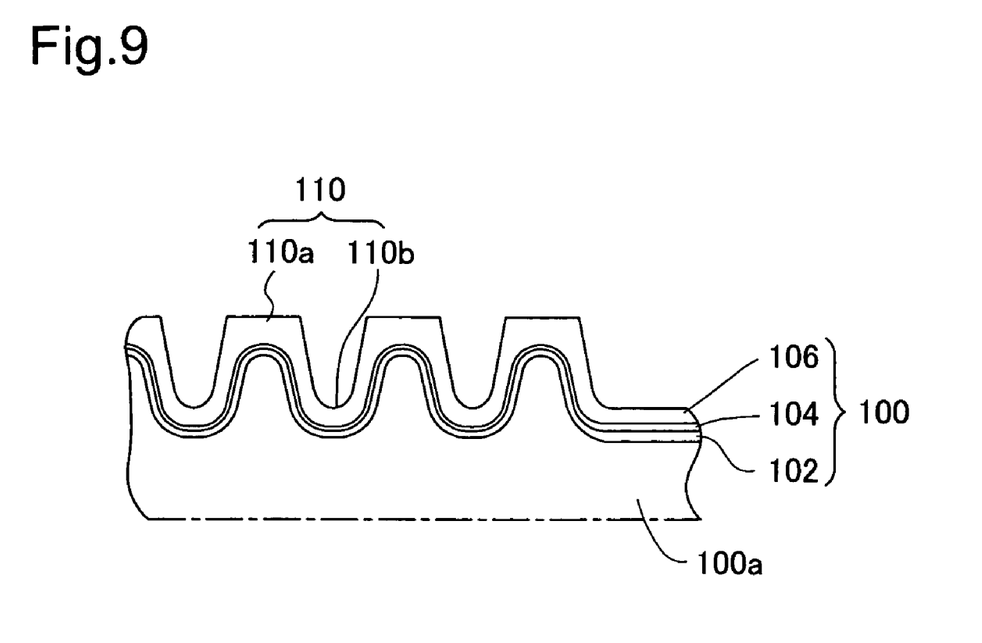
FIG. 9 is a cross-sectional view illustrating the vicinity of the corrugated part of a related resin pipe.

Conventionally, when the type of resin pipe has been applied to piping for fuel, such as an inlet pipe, a barrier layer that has excellent resistance to fuel permeation has been interposed in order to reduce the amount of fuel vapor that escapes to the outside. The provision of a corrugated part to facilitate bending along the filling pathway is known in this type of inlet pipe (for example, JP-A-7-217776). FIG. 9 is a cross-sectional view showing the vicinity of the corrugated part of a conventional resin pipe. A resin pipe 100 comprises a flow path 100$a$ and the multiple layers of an inner layer 102, a barrier layer 104, and an outer layer 106, where peaks 110$a$ and valleys 110$b$ form the corrugated part 110. This type of resin pipe 100 may be manufactured using a blow molding method or a corrugation fabrication method. The blow molding method is a method wherein a multilayer parison is blown to use a die to shape the parison into a corrugated shape, and the corrugation molding method is a method wherein shaping is done into a corrugated shape using a die that is moved in a looped path as a multilayer extruded pipe body is extruded.

However, in this type of molding process, when shaping into a corrugated part 110, the thickness of the barrier layer 104 in the corrugated part 110 falls to less than 50% of the thickness in the straight part because the barrier layer 104 is also elongated along the molding surface of the die, and the surface area of the barrier layer 104 is also expanded. This has a negative effect on the resistance to fuel permeation, proportional to the reduction in wall thickness and proportional to the increase in surface area. Because of this, it is necessary in the corrugated part 110 to provide a thickness in the barrier layer 104 that anticipates thinning of the corrugated part 110, which increases the amount of the expensive barrier layer 104 material that is used, increasing costs.

SUMMARY

An advantage of some aspects of the invention is to provide a resin pipe that is fabricated from a resin material with a small wall thickness in the barrier layer in the corrugation part and that is provided with superior resistance to fuel permeation and a resin molded component including the resin pipe.

According to an aspect of the invention is provided with a resin pipe comprising a corrugated part formed to alternate parts of peaks and valleys, and a flow path in the corrugated part by extruding multiple resin materials simultaneously. The resin pipe comprises an outer layer made of a first resin material; and a barrier layer that is formed on the flow path side of the outer layer and made of a second resin material that has resistance to fuel permeation superior to that of the first resin material. The corrugated part is configured to have a relation of $d<L$, where d is a depth from an apex of the peak to a bottom of the valley, and L is a distance from the apex of the peak to an outer surface of the barrier layer.

The resin pipe according to the present invention is provided with a corrugated part provided with a series of peaks and valleys, where, by this corrugated part bending, the resin pipe can easily follow a bent route. Moreover, a barrier layer is disposed towards the flow path side of the outer layer, including in the corrugated part. The barrier layer is fabricated from a resin material that has better resistance to fuel permeation than the resin material of the outer layer, so the vapors of the fluid that flows through the flow path are blocked by the barrier layer, thus reducing the amount that escapes to the outside.

Additionally, defining the depth from the apex of the peak to the bottom of the valley in the corrugated part as d and defining the distance from the apex of the peak to the outer layer side of the barrier layer as L, the structure is such that $d<L$. This structure prevents an excessive reduction in the thickness of the barrier layer and an excessive increase in the surface area of the barrier layer because the barrier layer does not bend excessively along the outside shape of the corrugated part when the corrugated part is shaped as the multiple resin materials are extruded simultaneously. This makes it possible for the resin pipe to be provided with superior resistance to fuel permeation due to the barrier layer.

Furthermore, there is no need to increase the thickness of the barrier layer during extrusion in anticipation of the amount by which the barrier layer disposed in the corrugated part is thinned, as with the conventional technology, making it possible to reduce the amount of the costly barrier layer material that is used. Furthermore, by positioning the barrier layer further towards the flow path side than the bottom of the valley of the corrugated part, minor damage to the outer layer of the corrugated part will not reach the barrier layer, and thus will have no impact on the resistance to fuel permeation.

In another form according to the present invention, an essentially pipe-shaped straight part is provided connected to the corrugated part, and with the depth from the apex of the peak to the bottom of the valley defined as d and the wall thickness in the straight part defined as t, the structure can be such that $d<t$. By having the structure such that the depth d of the valley of the corrugated part is less than the wall thickness t of the straight part, the inner layer (the barrier layer) will not be drawn into the peak, making it possible to reduce the surface area of the barrier layer.

Furthermore, in a preferred form of the present invention, the barrier layer, disposed on the straight part, can be structured so as to be disposed at $Lb>t/2$, if the distance from the outer surface of the outer layer of the straight part to the outer layer side of the barrier layer is defined as Lb. Given this structure, the wall thickness of the outer layer is thicker than the wall thickness of the flow path side of the barrier layer, so when the corrugated part that connects to the straight part is shaped and the first resin material that forms the outer layer is subjected to plastic deformation so as to form the peaks and valleys, the amount of plastic deformation of the barrier layer will be small, so the barrier layer will not be bent excessively following the outside shape of the corrugated part, thus preventing an excessive reduction in the wall thickness of the barrier layer and preventing an increase in the surface area. In this case, preparing the first resin material so as to have a Young's modulus of elasticity that is less than that of the second resin material can facilitate the molding of the outer layer and can cause the deformation of the barrier layer to be even less.

Moreover, in another form, the second resin material is a resin material with superior resistance to fuel permeation, where an inner layer made from a third resin material provided with durability to the fuel may be structured layered on the flow path-side surface of the barrier layer. This structure makes it possible to increase the resistance to fuel permeation by the barrier layer by adding the fuel durability of the inner layer when the resin pipe is used for fuel.

In yet another form, it is possible to have a structure wherein an adhesive layer, made from a fourth resin material, is provided between the outer layer and the barrier layer, and provided between the barrier layer and the inner layer, thereby making it possible to achieve reliably adhesion between the various layers. Here the first and third resin materials may be polyethylene, the second resin material may be an ethylene vinyl alcohol copolymer, and the fourth resin material may be formed from a modified polyethylene that chemically adheres to the ethylene vinyl alcohol copolymer.

Another preferred form of the present invention is provided with a resin molded component that comprises an injection molded component that is fabricated through injection molding and is welded to the resin pipe. The injection molded component is made of the first resin material, and comprises a molded component welding surface. The resin pipe comprises a pipe welding surface for welding to the molded component welding surface, formed on the corrugated part, wherein the pipe welding surface is a surface that is formed from the outer layer, extending from an outer peripheral part of the peak of the corrugated part to the barrier layer. In this form, the pipe welding surface can be formed by providing an inclined surface that is formed extending from the outer peripheral part of the peak to the bottom of the valley, or may be formed by providing a surface that is formed by cutting the peak towards the barrier layer.

These and other objects, features, aspects, and advantages of the present invention will become more apparent from the following detailed description of the preferred embodiments with the accompanying drawings.

DESCRIPTION OF THE PREFERRED EMBODIMENTS (1) Structure of a Fuel Supplying Mechanism 10

Figure 1:
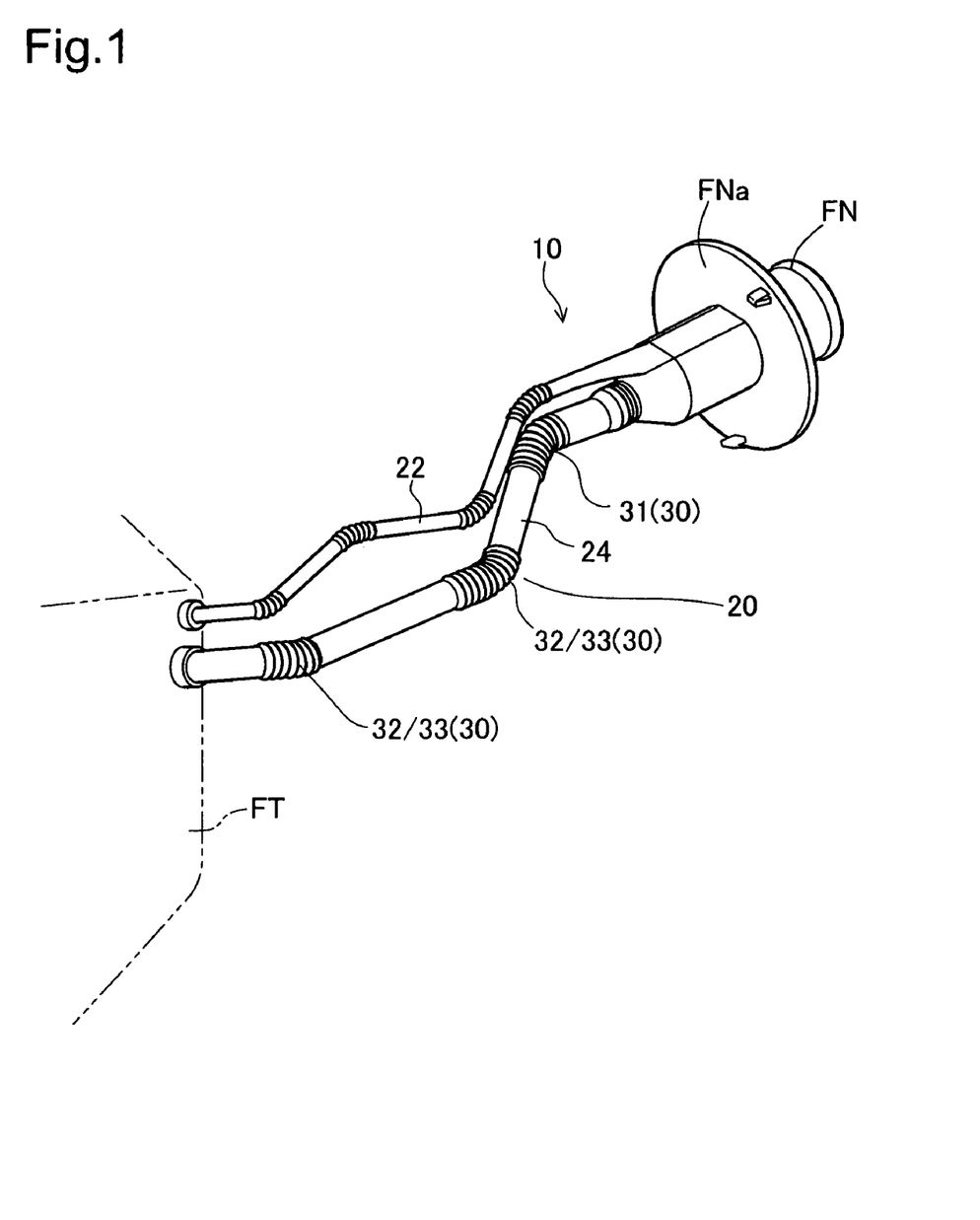
FIG. 1 is an oblique view illustrating a fuel supplying mechanism that is connected to a fuel tank by a filler pipe having a corrugated part according to a first embodiment according to the present invention.

FIG. 1 is an oblique view illustrating a fuel supplying mechanism for connecting to a fuel tank using a filler pipe having a corrugated part according to a first embodiment according to the present invention. The fuel supplying mechanism 10 is used to supply fuel to an automobile fuel tank FT, and comprises a filler pipe 20 (resin pipe) that is connected to a filler neck FN, and a breather pipe 22 for venting the internal pressure within the fuel tank FT when fuel is filled, where the breather pipe 22 branches from the filler pipe 20. The filler pipe 20 forms a flow path from the filler neck FN to the fuel tank FT. A flange FNa is formed on the outer wall of the filler neck FN, where the fuel supplying mechanism 10 is attached to an automobile member through attaching the flange FNa to an inlet box (not shown). The filler pipe 20 comprises a straight part 24 and a corrugated part 30 that is attached to the straight part 24. The corrugated part 30 is provided to facilitate placement into a curved pathway from the filler neck FN to the fuel tank FT.

Figure 2:
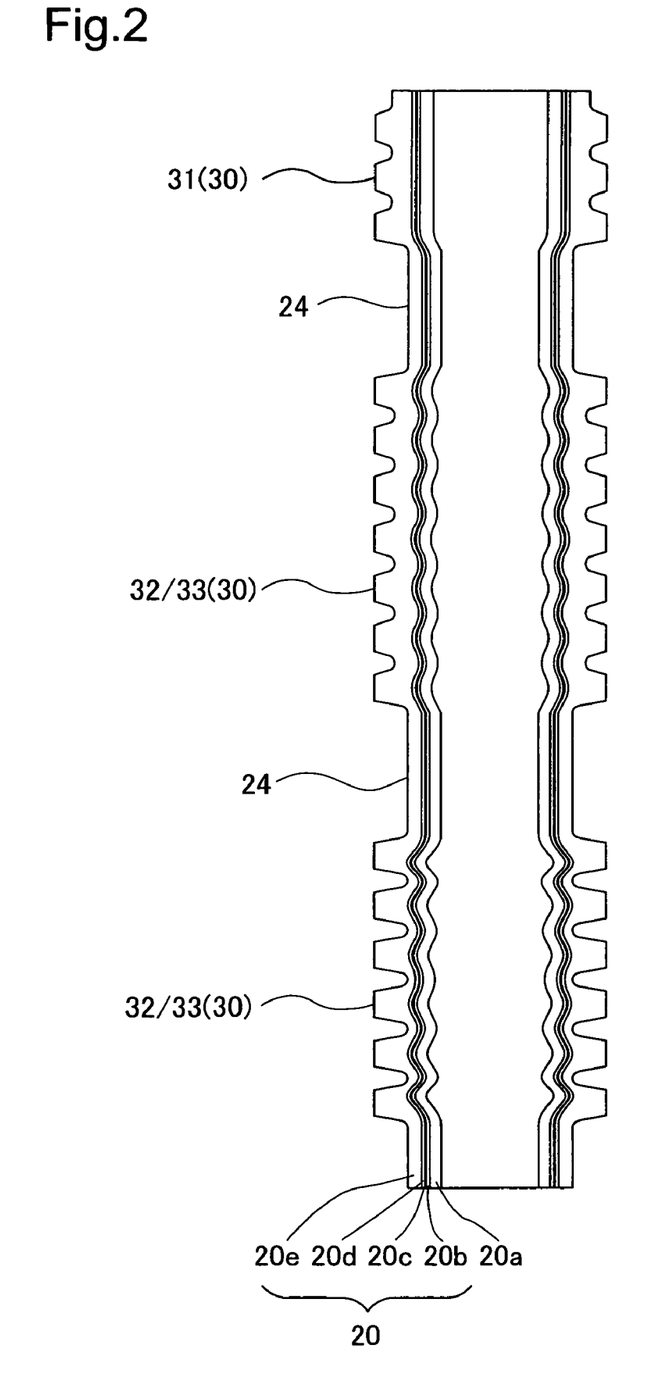
FIG. 2 is a cross-sectional view illustrating the filler pipe.

FIG. 2 is a cross-sectional view illustrating the filler pipe 20. The filler pipe 20 is formed from five layers, with a barrier layer formed from a resin material with superior resistance to fuel permeation interposed between other layers. That is, the filler pipe 20 comprises an inner layer 20a, an adhesive layer 20b, a barrier layer 20c and an adhesive layer 20d, and an outer layer 20e, manufactured by a corrugation molding method, described below, wherein the constituent resin materials are extruded simultaneously and formed into a pipe shape.

Here a high density polyethylene (HDPE) (a third resin material) is selected for the inner layer 20a, with the primary purpose thereof being that of withstanding the fuel. An ethylene vinyl alcohol copolymer (EVOH) (the second resin material) is selected for the barrier layer 20c, with the main objective thereof being resistance to fuel permeation. A high density polyethylene (HDPE) (the first resin material) is selected for the outer layer 20e, with the primary objective thereof being mechanical strength. A modified polyethylene (m-PE) with a maleate modification as a polar functional group is selected for the adhesive layers 20b and 20d, with the primary purpose thereof being that of adhering the barrier layer 20c both to the inner layer 20a and to the outer layer 20e. The modified polyethylene is not only welded to the HDPE of the outer layer 20e and the inner layer 20a, which are made out of polyethylene of the same family, but also is bonded to the EVOH by chemical bonding, and thus has the effect of bonding between the layers. Here, in the filler pipe 20, the Young's modulus of elasticity of the resin materials used in each of the layers are 1000 MPa for the HDPE, 750 MPa for the modified PE, and 3000 MPa for the EVOH.

The various resin materials are prepared so that, at the time of extrusion molding, the melt flow rate in JIS Specification K7210 will be 0.2 g/10 min. for the HDPE, 1.6 g/10 min. for the EVOH, and 0.7 g/10 min for the modified PE.

Moreover, when the wall thickness t of the straight part 24 is 4 mm, the inner layer 20a is prepared at 1.0 mm, the adhesive layers 20b and 20d are prepared at 0.5 mm, the barrier layer 20c is prepared at 0.3 mm, and the outer layer 20e is prepared 1.7 mm. That is, when the distance from the outer surface of the outer layer 20e of the straight part 24 to the outer layer 20e side of the barrier layer 20c is defined as Lb, the barrier layer 20c is disposed so that Lb>t/2.

Figure 3A:
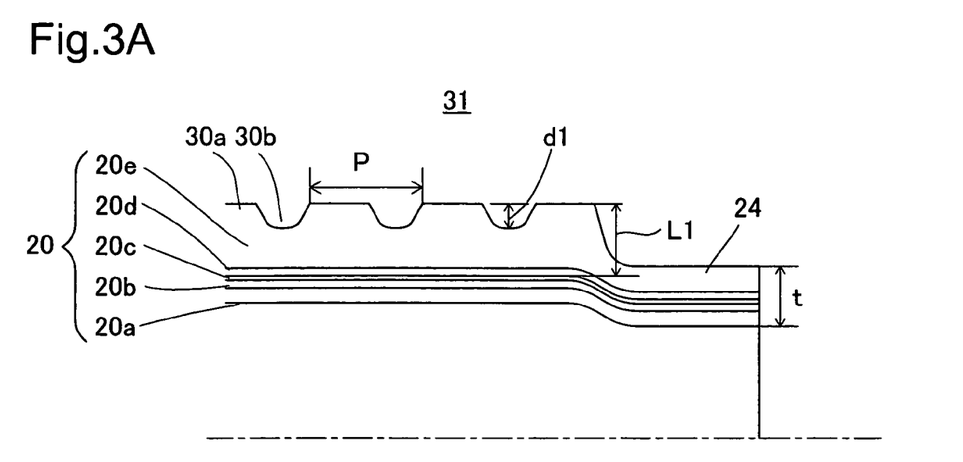
FIG. 3A through FIG. 3C show the corrugated part.
Figure 3B:
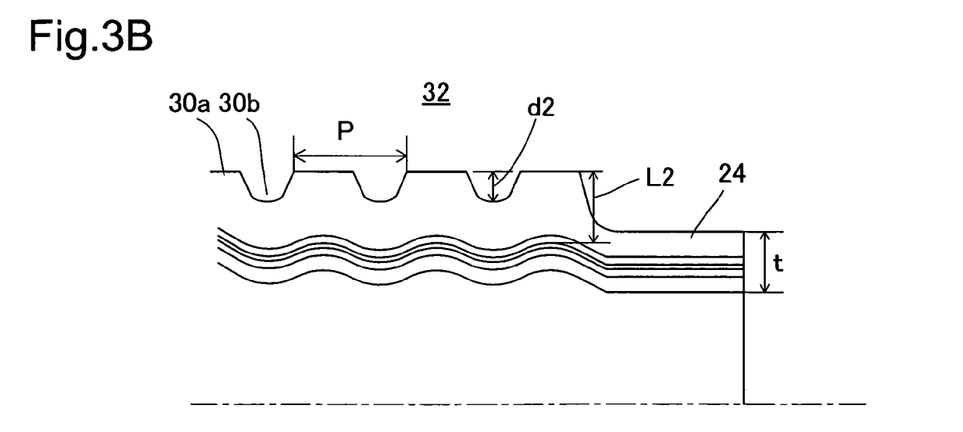
Figure 3C:
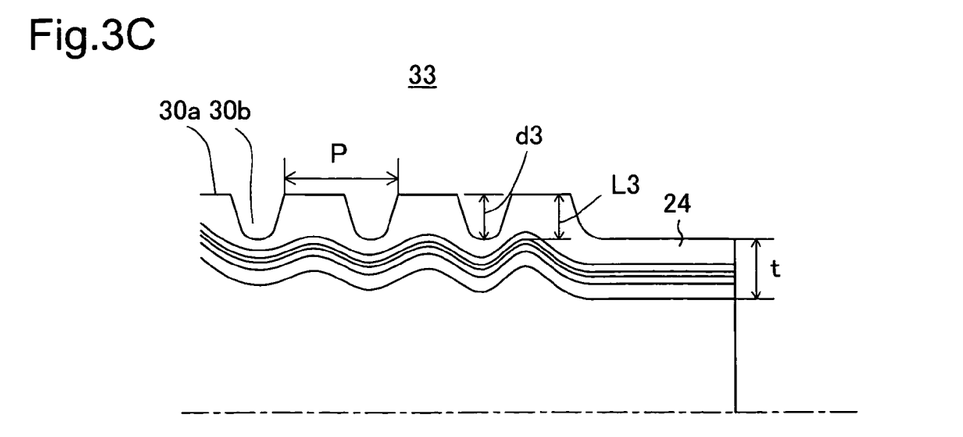

FIG. 3 is a cross-sectional view illustrating the corrugated part, where the corrugated parts 30 in the individual figures FIG. 3A through FIG. 3c are connected to the straight parts 24 and are formed as a series of peaks 30a and valleys 30b, and have the ability to flex in a direction that is perpendicular to the axial direction. Each of the first through third corrugated parts 31 through 33 have the same pitch P of 5 mm, but the depths d1 through d3 of the valleys 30b are different. In other words, when the outer diameter of the straight part 24 is 34 mm and wall thickness t is 4 mm, then the depth d1 of the valley 30b of the first corrugated part 31 in FIG. 3A is 1.5 mm, the depth d2 of the valley 30b of the second corrugated part 32 of FIG. 3B is 2 mm, and the depth d3 of the valley of the third corrugated part 33 in FIG. 3C is 3 mm. At this time, the relationships between the depths d1 to d3 of the valleys 30b in the first through third corrugated parts 31 to 33 to the wall thickness t of the straight part 24 are given by d1=0.375 t, d2=0.5 t, and d3=0.75t. Note that the valley as seen conventionally, in FIG. 9, has a valley depth d of 8 mm, where d=2t. The effects accompanying having the depths d1 through d3 of the valleys 30b of the first through third corrugated parts 31 to 33 being mutually different will be described below.

(2) Manufacturing Process for the Fuel Supplying Mechanism 10

Figure 4:
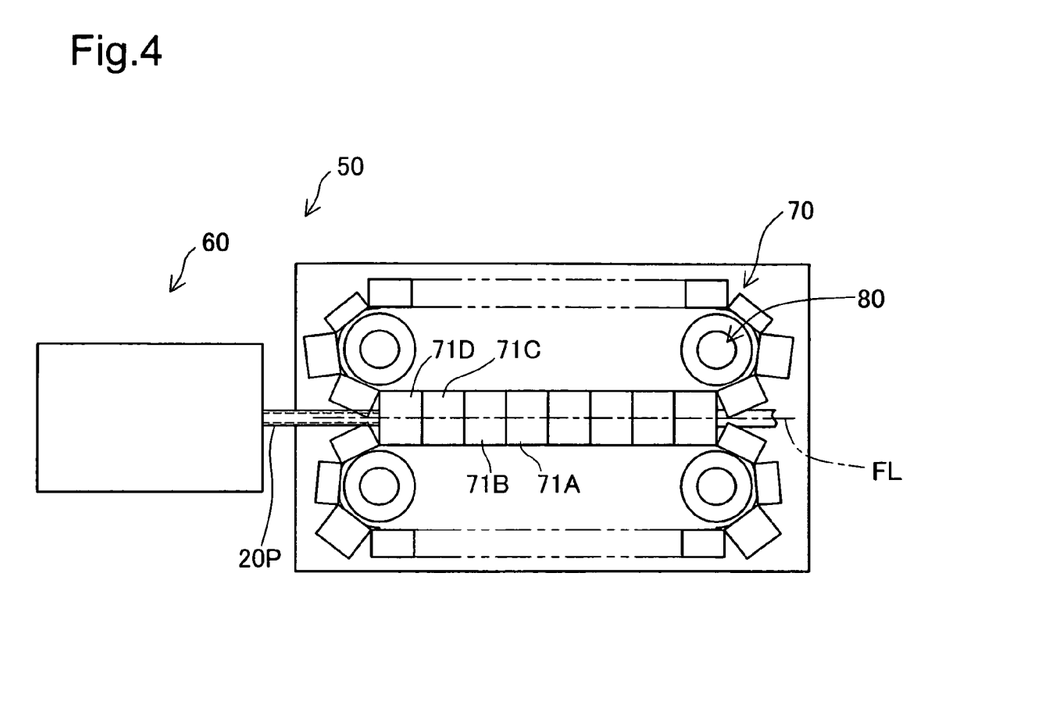
FIG. 4 is a schematic structural view for explaining a pipe manufacturing device for manufacturing the filler pipe.

The method of manufacturing the filler pipe 20 will be explained next. FIG. 4 is a schematic structural diagram for explaining the pipe manufacturing device 50 for manufacturing the filler pipe 20. The pipe manufacturing device 50 is able to fabricate a filler pipe 20 continuously with different cross-sectional shapes for the straight part 24 and the corrugated part 30 using a so-called corrugation mechanism. The pipe manufacturing device 50 comprises a pipe extruding unit 60 for extruding the extruded pipe 20P, a molding die unit 70 for shaping the outer peripheral part of the extruded pipe 20P that is extruded from the pipe extruding unit 60, and a transport device 80 for transporting, in a looped path, the molding die unit 70.

The pipe extruding unit 60 is provided with an extruding device for extruding five layers of resin materials for the filler pipe 20 concentrically, where the extruding device comprises a screw, a cylinder, and a die. The molding die unit 70 has molding surfaces for each of the parts of the filler pipe 20, or in other words, is provided with a plurality of dies 71 (71A through 71D . . . ) for each of the molding surfaces in the shape of the straight part 24 and the corrugated parts 30, each disposed along the conveyance path SL along which the extruded pipe 20P will be conveyed. The die 71 is formed from a split die that is divided along the axis of the extruded pipe 20P that is transported, where the split die are each loop shaped, and are disposed so as to be able to be clamped together. In the molding surface of the die 71, there is a vacuum flow path that connects to a vacuum pump, not shown.

In manufacturing a filler pipe 20 using the pipe manufacturing device 50, first the extruded pipe 20P is extruded from the pipe extruding unit 60, after which the die 71 of the molding die unit 70 is transported in the shape of a loop. At this time, the die 71 is blown into the inside of the extruded pipe 20P, and the first through third corrugated parts 31 through 33 are shaped through suction by the vacuum pump of the molding surface of the die 71. Here, the wall thickness of the barrier layer 20c is thinner in the corrugated part 30; however, the depth d of the valley 30b is reduced, making it possible to maintain a wall thickness that is 70% or more of the wall thickness of the extruded pipe 20P. This type of continuous process is repeated, and the shaped extruded pipe 20P is cut at a specific position. After this, the extruded pipe, wherein the corrugated part is formed, is preheated to 80 to 90° C., the softening point of the resin, and a bending process following a bent indentation of a molding die, not shown, is performed to produce the filler pipe 20. Here the bending process may be a process that is performed along the entire length of the filler pipe 20, or may be a process that is performed on only a location that is difficult to bend because the valley 30b is small, such as in the first corrugated part 31.

(3) Operation and Effects of the Filler Pipe 20

The operating effects of the filler pipe 20 and the manufacturing method thereof are as follows:

(3)-1 Because the filler pipe 20 is provided with a corrugated part 30 wherein peaks 30a and valleys 30b are disposed continuously, the filler pipe 20 can be routed easily through a curved passageway by bending the corrugated part 30. Moreover, as is shown in FIG. 3, the corrugated part 30 uses three different shapes with different depths of the valleys 30b, and when considering the resistance to fuel permeation, this provides both ease of pipe design and ease of fuel flow. In other words, the first corrugated part 31 has a valley 30b wherein the depth b1 is small, at 1.5 mm, making it possible to reduce the resistance in the flow path by having the flow path be smoother. Consequently, this is applied to a location wherein the amount of flow is high, in the vicinity of the inlet of the filler pipe 20 when fueling. On the other hand, the second corrugated part 32 and the third corrugated part 33 have larger values for d2 (2 mm) and d3 (3 mm), which provide superior routability due to the ease of bending, and superior vibration absorbance. As a result, these are applied to locations in the middle of the filler pipe 20, where one wishes to provide ease in routing, and wishes to absorb the shifting of the fuel tank due to vehicular vibrations.

(3)-2 The barrier layer 20c is formed from a resin material with resistance to fuel permeation that is greater than that of the resin material of the outer layer 20e, and thus can block the escape of fuel vapors flowing within the fuel path, reducing the amount of emission to the outside.

Furthermore, the barrier layer 20c is structured as described below in order to prevent, as much as possible, thinning of the barrier layer 20c due to the forming of the corrugated part 30. That is, the first through third corrugated parts 31-33 are formed such that d<L in the relationship between the depth d (1-3) of the valley 31b and the distance L (1-3) between the apex of the peak 30a and the barrier layer 20c, and, in relation to the thickness t, the filler pipe 20 is formed such that d<t. This makes it possible to maintain a wall thickness of 70% or more of the pre-extrusion wall thickness through not excessively stretching the barrier layer 20c when shaping the first through third corrugated parts 31 and when extruding multiple types of resin simultaneously. Moreover, when compared to the prior art, the surface area of the barrier layer 20c is also smaller. This makes it possible for the barrier layer 20c to have superior resistance to permeation because the wall thickness and the increase in surface area, when compared to the wall thickness immediately after extrusion, is small, and the increase in the surface area is also small.

Furthermore, there is no need to increase the wall thickness of the barrier layer at the time of extrusion in anticipation of the barrier layer in the corrugated part becoming thinner at the time of the extrusion, as is the case in the prior art, making it possible to reduce the amount of the expensive barrier layer material used.

Furthermore, because the barrier layer 20c is positioned further towards the inside than the bottom of the valleys 30b of the corrugated parts 30, then even if there is some degree of damage to the outer layer of the corrugated parts 30, the damage will not reach the barrier layer 20c, and will have no impact on the resistance to fuel permeation.

(3)-3 By changing the molding surface of the die 71, the depth of the corrugated part 30 can also be changed easily in the filler pipe 20.

(3)-4 When it comes to the barrier layer 20c disposed in the straight part 24, the wall thickness of the outer layer 20e is thicker than the wall thickness of the barrier layer 20c on the flow path side, so when the corrugated part 30 that connects to the straight part 24 is shaped, the first resin material that forms the outer layer 20e undergoes plastic deformation to form the peaks 30a and the valleys 30b, where the plastic deformation of the barrier layer 20c is relatively small, so the barrier layer 20c does not bend excessively along the outside shape of the corrugated part 30, thus preventing all the more an excessive decrease in the wall thickness and increase in the surface area. Furthermore, the HDPE (the first resin material) of the outer layer 20e is a resin material that has a Young's modulus of elasticity that is less than that of the EVOH (the second resin material) of the barrier layer 20c, not only making the outer layer 20e easily moldable, but also making it possible to reduce all the more the deformation of the barrier layer 20c.

Figure 5:
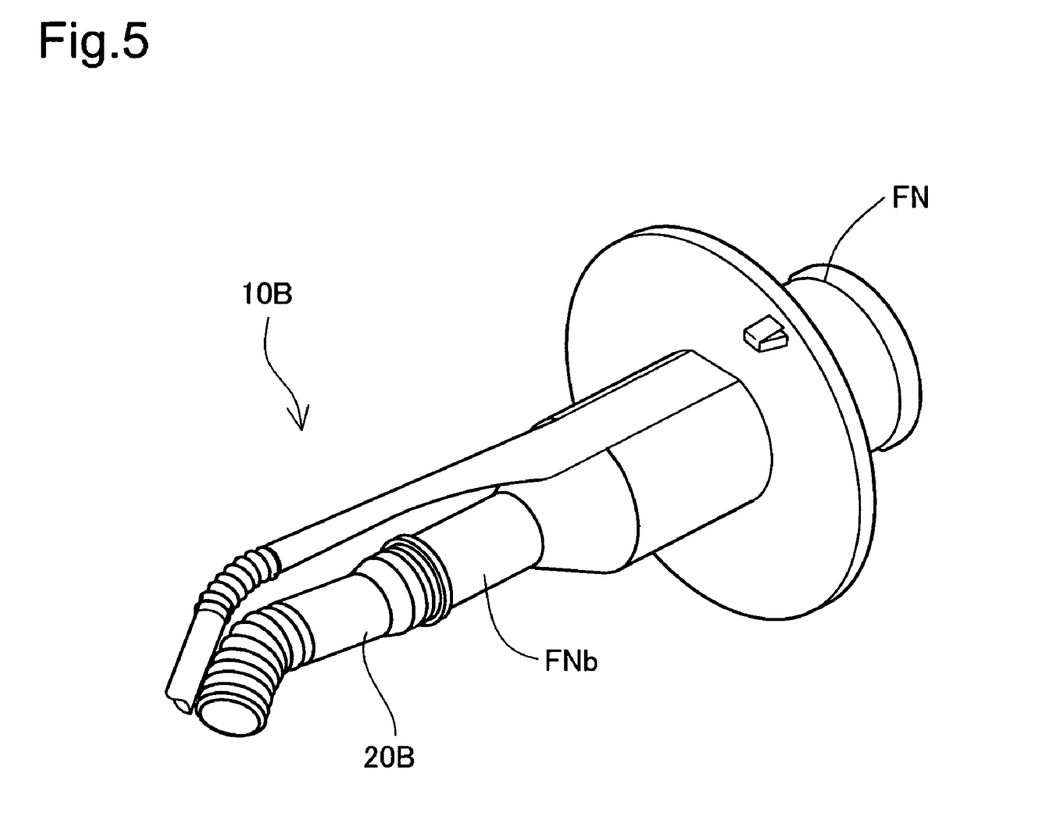
FIG. 5 is an oblique view showing the critical parts of a fuel supplying mechanism according to a second embodiment.
Figure 6:
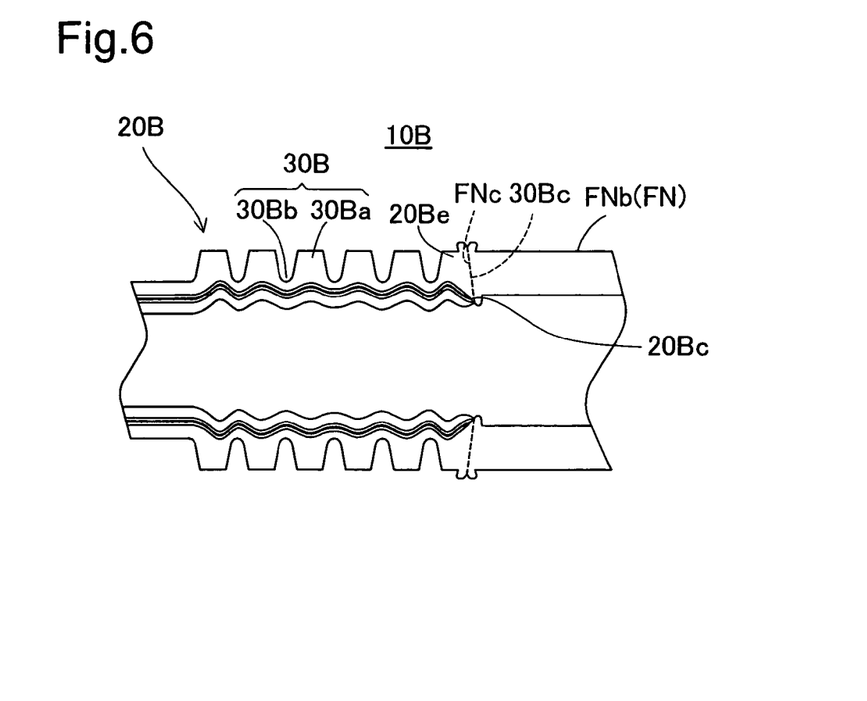
FIG. 6 is a cross-sectional view illustrating the vicinity of the welding part between the filler pipe and a filler neck outflow pipe.
Figure 7:
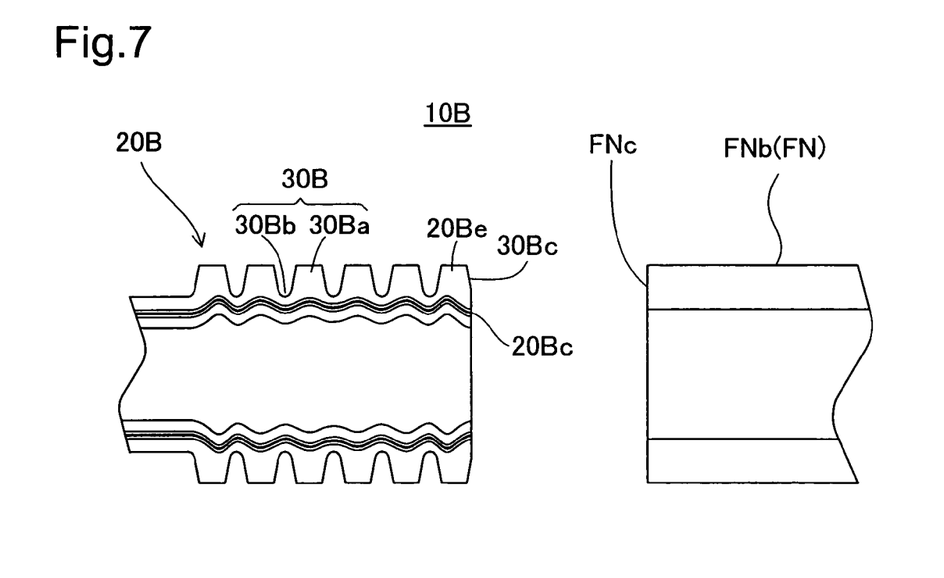
FIG. 7 shows the state prior to welding the filler pipe and the outflow pipe.

FIG. 5 is a oblique view illustrating the critical parts of a fuel supplying mechanism 10B according to a second embodiment. The present embodiment has a distinguishing feature in the structure wherein an outflow pipe FNb of the filler neck FN being welded to a connector part of the filler pipe 20B. That is, the outflow pipe FNb of the filler neck FN is connected, by welding to the filler pipe 20B. FIG. 6 is a cross-sectional view illustrating the vicinity of the welding part between the outflow pipe FNb and the filler pipe 20B and FIG. 7 shows the state prior to welding the outflow pipe FNb to the filler pipe 20B. The outflow pipe FNb is fabricated from HDPE (the first resin material) through injection molding, where a molded component welding surface FNc is provided on end thereof. On the other hand, a corrugated part 30B, provided with a peak 30Ba and a valley 30Bb is formed on the end part of the filler pipe 20B. The corrugated part 30B is provided with a pipe welding surface 30Bc that is welded to the molded component welding surface FNc of the outflow pipe FNb on the end part thereof. The pipe welding surface 30Bc is a surface that is formed from the outer layer 20Be extending from the outer peripheral part of the peak 30Ba of the corrugated part 30B to the barrier layer 20Bc, or in other words, is the inclined surface of the peak 30Ba when cut at the bottom of the valley 30Bb.

In connecting the outflow pipe FNb to the filler pipe 20B, the molded component side welding surface FNc and the pipe welding surface 30Bc are heated using a hot plate (not shown), or the like, and the both sides are pressed together. The pipe welding surface 30Bc is a broad surface formed from the outer layer 20Be extending from the outer peripheral part of the peak 30Ba of the corrugated part 30B to the barrier layer 20Bc, and because it is a surface that does not expose the edge surface of the barrier layer 20Bc, a large surface area contacts the molded component welding surface FNc of the outflow pipe FNb, and because both surfaces are formed from the same first resin material, a strong weld is made with the molded component welding surface FNc.

Figure 8:
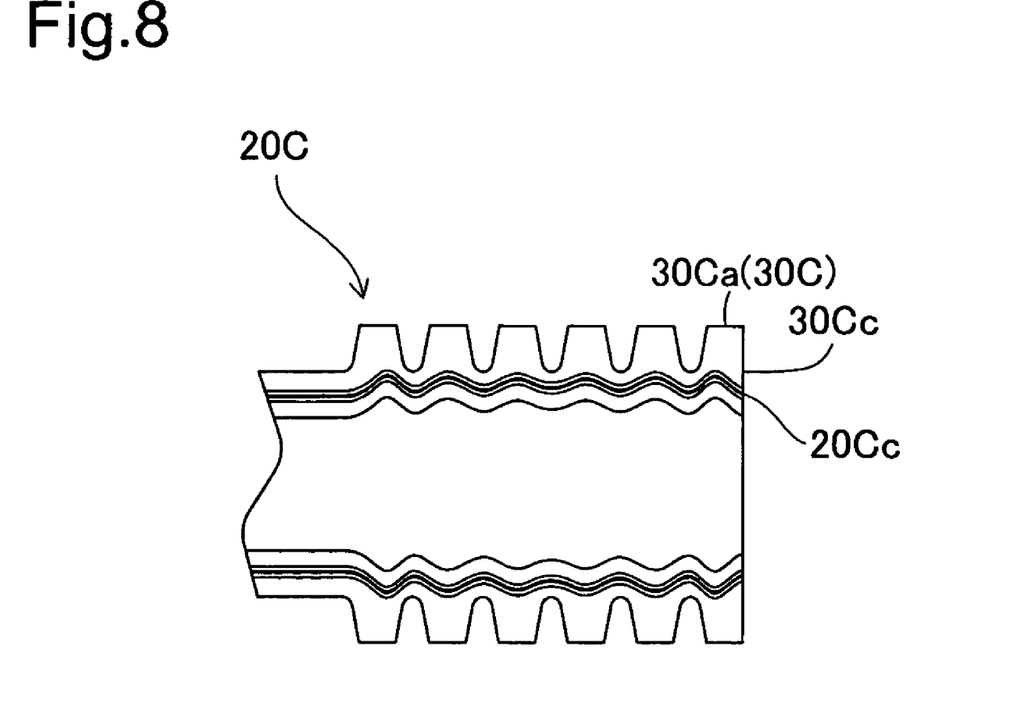
FIG. 8 shows a modified example of the second embodiment.

Note that instead of using the inclined surface of the peak for the pipe welding surface, as in the second embodiment, any surface that has a broad surface area on the outer layer of the peak, that does not expose the barrier layer may be used. For example, as is shown in the modified example in FIG. 8, the pipe welding surface 30Cc of the filler pipe 20C may be a surface that is formed when a cut is made at a right angle from the outer peripheral part of the a peak 30Ca of the corrugated part 30C towards the barrier layer 20Cc.

(4) The present invention is not limited to the embodiment described above, but rather may be embodied in a variety of forms in a scope that does not depart from the spirit and intent thereof, and may also be modified as described below.

(4)-1 Preferably a material with superior resistance to fuel permeation is used as the resin material for molding the filler pipe. For example, a variety of materials, such as high density polyethylene (HDPE), medium-density polyethylene (MDPE), polyamide (PA), or polyoxymethlyene (acetyl) (POM), or the like, may be used. Moreover, for the barrier layer, along with an ethylene vinyl alcohol copolymer (EVOH), fluorine resin (ETFE or PVDF), poly phenylene sulfide (PPS) or polyethylene terephthalate (PET), or the like, can be used.

(4)-2 Although in the embodiment described above, a structure was explained wherein an adhesive layer was used to adhere a barrier layer to an inner layer and an outer layer, the present invention is not limited there to, and instead a modified PE may be used as the resin material for the inner layer and the outer layer to provide adhesion with the barrier layer in order to eliminate the adhesive layer, enabling a simple three-layer structure.

(4)-3 While in the embodiment described above, a filler pipe 20 was fabricated using the corrugation fabrication method, the present invention is not limited thereto, but rather an blow molding method may be used.

(4)-4 A corrugated part of a depth equal to that of the conventional example shown in FIG. 9 may be provided in parallel at the end that connects to the fuel tank FT, or in the middle, to shift the resonant frequency of the filler pipe 20 and the fuel tank FT to not only absorb the vibration of the vehicle but also to improve the ease of attachment of the line.

(4)-5 While in the embodiment described above, the present invention was applied to a filler pipe, the present invention is not limited thereto, but rather can also be applied to, for example, water pipes for an engine cooling system, or the like.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A resin pipe comprising a corrugated part formed to have alternating peaks and valleys, and a flow path in the corrugated part by extruding multiple resin materials simultaneously, the resin pipe comprising:
    an outer layer made of a first resin material; and
    a barrier layer that is formed on a flow path side of the outer layer and made of a second resin material that has resistance to fuel permeation superior to that of the first resin material, wherein
    the barrier layer is part of a simultaneous extrusion of multiple resin materials, so that the barrier layer chemically adheres to the outer layer, and
    the corrugated part is configured to have a relation of d<L, where d is a depth from an apex of a peak to a bottom of a valley, and L is a distance from the apex of the peak to an outer surface of the barrier layer.

2. The resin pipe in accordance with claim 1, further comprising an essentially pipe-shaped straight part connected to the corrugated part, the resin pipe having a relation of d<t, where t is a wall thickness of the straight part.

3. The resin pipe in accordance with claim 1, further comprising an essentially pipe-shaped straight part connected to the corrugated part, wherein the barrier layer disposed in the straight part is disposed at Lb>t/2, where Lb is a distance from an outer surface of the outer layer of the straight part to the outer surface of the barrier layer.

4. The resin pipe in accordance with claim 1, wherein the first resin material is made of a resin material that has a lower Young's modulus of elasticity than the second resin material.

5. The resin pipe in accordance with claim 1, further comprising an inner layer that is layered on a surface on the flow path side of the barrier layer and made of a third resin material that is durable when exposed to fuel.

6. The resin pipe in accordance with claim 5, further comprising adhesive layers, wherein the adhesive layers are disposed between the outer layer and the barrier layer, and between the baffler layer and the inner layer respectively, and the adhesive layers are made of a fourth resin material.

7. The resin pipe in accordance with claim 6, where the first and third resin materials are polyethylene, the second resin material is a ethylene vinyl alcohol copolymer, and the fourth resin material is a modified polyethylene that chemically bonds to the ethylene vinyl alcohol copolymer.

8. A resin molded component in accordance with claim 1, wherein:
the resin molded component includes an injection molded component that is fabricated by injection molding and is welded to the resin pipe;
the injection molded component is made of the first resin material, and includes a molded component welding surface;
the resin pipe comprises a pipe welding surface, formed on the corrugated part for welding to the molded component welding surface; and
the pipe welding surface is a surface that is formed on the outer layer, extending from an outer peripheral part of the peak of the corrugated part to the barrier layer.

9. The resin molded component in accordance with claim 8, wherein the pipe welding surface is an angled surface that is formed to span from an outer peripheral part of the peak to a bottom of a valley.

10. The resin molded component in accordance with claim 8, wherein the pipe welding surface is a surface that is formed when the peak is cut towards the barrier layer.

11. A resin pipe comprising a corrugated part, which has alternating peaks and valleys, and a flow path that is formed in the corrugated part by a simultaneous extrusion of multiple resin materials, the resin pipe further comprising:
an outer layer made of a first resin material; and
a barrier layer that is formed on a flow path side of the outer layer and made of a second resin material that has resistance to fuel permeation superior to that of the first resin material, wherein
the corrugated part is configured to have a relation of $d<L$, where d is a depth from an apex of a peak to a bottom of a valley, and L is a distance from the apex of the peak to an outer surface of the barrier layer, and
the resin pipe further comprises an inner layer that is layered on a surface on the flow path side of the barrier layer and made of a third resin material that is durable when exposed to fuel.

12. The resin pipe in accordance with claim 11, further comprising an essentially pipe-shaped straight part connected to the corrugated part, the resin pipe having a relation of $d<t$, where t is a wall thickness of the straight part.

13. The resin pipe in accordance with claim 11, further comprising an essentially pipe-shaped straight part connected to the corrugated part, wherein the barrier layer disposed in the straight part is disposed at $Lb>t/2$, where Lb is a distance from an outer surface of the outer layer of the straight part to the outer surface of the barrier layer.

14. The resin pipe in accordance with claim 11, wherein the first resin material is made of a resin material that has a lower Young's modulus of elasticity than the second resin material.

15. The resin pipe in accordance with claim 11, further comprising adhesive layers, wherein the adhesive layers are disposed between the outer layer and the barrier layer, and between the barrier layer and the inner layer respectively, and the adhesive layers are made of a fourth resin material 16. The resin pipe in accordance with claim 15, wherein the first and third resin materials are polyethylene, the second rain material is a ethylene vinyl alcohol copolymer, and the fourth resin material is a modified polyethylene that chemically bonds to the ethylene vinyl alcohol copolymer.

17. A resin molded component in accordance with claim 11, wherein
the resin molded component includes an injection molded component that is fabricated by injection molding and is welded to the resin pipe;
the injection molded component is made of the first resin material, and includes a molded component welding surface;
the resin pipe comprises a pipe welding surface, formed on the corrugated part for welding to the molded component welding surface; and
the pipe welding surface is a surface that is formed on the outer layer, extending from an outer peripheral part of the peak of the corrugated part to the barrier layer.

18. The resin molded component in accordance wit claim 17, wherein the pipe welding surface is an angled surface that is formed to span from an outer peripheral part of the peek to a bottom of a valley.

19. The resin molded component in accordance with claim 17, wherein the pipe welding surface is a surface that is formed when the peak is cut towards the barrier layer.

* * * * *